United States Patent
Stroila (10) Patent No.: US 10,127,734 B2
(45) Date of Patent: *Nov. 13, 2018

(54) AUGMENTED REALITY PERSONALIZATION

(71) Applicant: HERE Global B.V., Eindhoven (NL)

(72) Inventor: Matei Stroila, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/817,375

(22) Filed: Nov. 20, 2017

(65) Prior Publication Data

US 2018/0082485 A1     Mar. 22, 2018

Related U.S. Application Data (63) Continuation of application No. 14/959,620, filed on Dec. 4, 2015, now Pat. No. 9,858,723, which is a continuation of application No. 13/324,156, filed on Dec. 13, 2011, now Pat. No. 9,230,367.

(51) Int. Cl.
  *G09G 5/00* (2006.01)
  *G06T 19/00* (2011.01)
  *G06T 11/60* (2006.01)

(52) U.S. Cl.
  CPC ............ *G06T 19/006* (2013.01); *G06T 11/60* (2013.01); *H05K 999/99* (2013.01)

(58) Field of Classification Search
  CPC .................................................... G06T 19/006
  See application file for complete search history.

(56) References Cited

U.S. PATENT DOCUMENTS

| | | |
|---|---|---|
| 7,274,380 B2 | 9/2007 | Navab et al. |
| 7,511,736 B2 | 3/2009 | Benton |
| 7,844,229 B2 | 11/2010 | Gyorfi et al. |
| 8,605,008 B1 | 12/2013 | Prest et al. |
| 2009/0061901 A1 | 3/2009 | Arrasvuori et al. |
| 2009/0289956 A1 | 11/2009 | Douris et al. |
| 2010/0177193 A1 | 7/2010 | Flores |
| 2010/0257252 A1 | 10/2010 | Dougherty et al. |
| 2011/0153341 A1 | 6/2011 | Diaz-Cortes |

(Continued)

FOREIGN PATENT DOCUMENTS

| | | |
|---|---|---|
| EP | 2302322 | 3/2011 |
| KR | 20110103676 | 9/2011 |

OTHER PUBLICATIONS

Burcher, JC Penny Augmented Reality 'virtual dressing room' Built in E-Commerce and Facebook Sharing Too!, viewed Dec. 11, 2011, Personal Thoughts on the Evolution of Media and Advertising.

(Continued)

*Primary Examiner* — Charles Tseng
(74) *Attorney, Agent, or Firm* — Lempia Summerfield Katz LLC (57) ABSTRACT

A method is provided, such as for mobile augmented reality personalization. A front-facing camera of the mobile device acquires a first view of a user of the mobile device. A personal characteristic of the user of the mobile device is identified from the first view. A location of the mobile device may be determined. A back-facing camera of the mobile device may acquire a second view of a region at the location. Augmented reality information is selected as a function of the personal characteristic. A second view is displayed with the augmented reality information.

20 Claims, 3 Drawing Sheets

(56) References Cited

U.S. PATENT DOCUMENTS

| | | |
|---|---|---|
| 2011/0216060 A1 | 9/2011 | Weising et al. |
| 2011/0285622 A1 | 11/2011 | Marti et al. |
| 2012/0054039 A1 | 3/2012 | Patwa et al. |
| 2012/0092328 A1 | 4/2012 | Flaks et al. |
| 2012/0130762 A1 | 5/2012 | Gale et al. |
| 2012/0212508 A1 | 8/2012 | Kimball |
| 2013/0042296 A1 | 2/2013 | Hastings et al. |

OTHER PUBLICATIONS

Dehshibi et al., A New Algorithm for Age Recognition from Facial Images, Abstract, Aug. 2010, Journal Signal Processing.
Face Recognition Homepage, viewed Dec. 13, 2011, face-rec.org.
Facial Expression Resource Page, viewed Dec. 13, 2011, kasrl.org/facial_expression.html.
Frischholz, The Face Detection Homepage, viewed Dec. 13, 2011, facedetection.com.
History of Mobile Augmented Reality, Christian Doppler Labratory for Handheld Augmented Reality for the ISMAR scoiety, viewed Dec. 13, 2011, https://www.icg.tugraz.at/~daniel/HistoryOfMobileAR/.
International Search Report and Written Opinion for related PCT application No. PCT/EP2012/072807, dated Apr. 18, 2013.
Kourogi et al., Wearable Augmented Reality System with Personal Positioning based on Walking Locomotion Analysis, 2003, pp. 260-261, ISMAR, Tokyo, Japan.
Leading the World with Face Detection Technology, viewed Dec. 13, 2011, Omron Global.
Lu et al., Gender Recognition using Adaboosted Feature, Abstract, Aug. 2007, Natural Computation, Third International Conference.
Perez, Augmented ID: Augmented Reality Facial Recognition for Mobile, Jul. 10, 2009, ReadWriteWeb.com.

AUGMENTED REALITY PERSONALIZATION

This application is a continuation under 35 U.S.C. § 120 and 37 C.F.R. § 1.53(b) of U.S. patent application Ser. No. 14/959,620, filed Dec. 4, 2015 now U.S. Pat. No. 9,858,723 which is a continuation application of U.S. patent application Ser. No. 13/324,156 filed Dec. 13, 2011 now U.S. Pat. No. 9,230,367, the disclosures of which are incorporated herein by reference in their entirety.

BACKGROUND

The present invention generally relates to data content for augmented reality. For example, augmented reality data used with navigation and/or mapping systems is provided.

Navigation systems or devices provide useful features, including the identification of routes to destinations or points of interests. The navigation system determines the optimum route to be taken to travel from the origin to the destination from map data. A database of locations (e.g., nodes) and streets (e.g., links) is used by the navigation system. The navigation is presented to the user. The locations may be augmented with further information in the presentation, providing augmented reality. Information about points of interest may be presented on a display of the mobile device based on the location of the mobile device. However, the augmented reality information may be cluttered on the display or not useful for the user of the mobile device.

SUMMARY

In one aspect, a method is provided, such as for mobile augmented reality personalization. A front-facing camera of the mobile device acquires a first view of a user of the mobile device. A personal characteristic of the user of the mobile device is identified from the first view. A location of the mobile device may be determined. A back-facing camera of the mobile device may acquire a second view of a region at the location. Augmented reality information is selected as a function of the personal characteristic. A second view is displayed with the augmented reality information.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Personalization allows delivery of augmented reality content specific to the user, such as specific geographical points of interest and/or advertising relevant to the particular user. The personalization may increase and enhance the use of navigation data in augmented reality applications.

Personal information about a user of the mobile device is used to control the augmented reality information presented on the mobile device. A camera on the mobile device may be used to determine a personal characteristic (e.g., gender) of the user. Rather than present all of the augmented reality information available for a location, a sub-set is selected based on the personal characteristic (e.g., women's restrooms and not men's restrooms).

Many mobile phones, such as smart phones, and mobile computers, such as tablets, have two cameras—a rear-facing and a front-facing camera. The front-facing camera is used to detect personal features of a user of the mobile device. The personal features change in real-time, such as mood, or are non-changing, such as race, age, gender, or identity. Based on one or more personal features, relevant information is overlaid in the viewfinder onto the video frames captured with the rear-facing camera. The augmented reality provided on the mobile device is personalized using the front-facing camera.

Data for personalizing augmented reality information may be collected, maintained, stored, or output as a service, such as associated with maintaining a database of mapping information. Software developers or advertisers may use the information in mapping, navigation, or augmented reality applications to output information at mobile devices.

Figure 1:
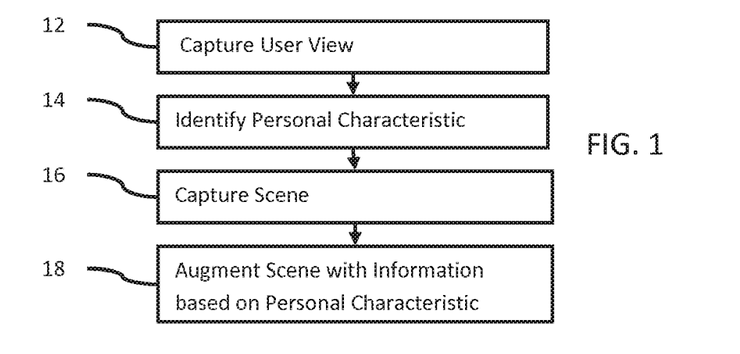
FIG. 1 illustrates a flow diagram of one embodiment of a method for mobile augmented reality personalization.
Figure 2:
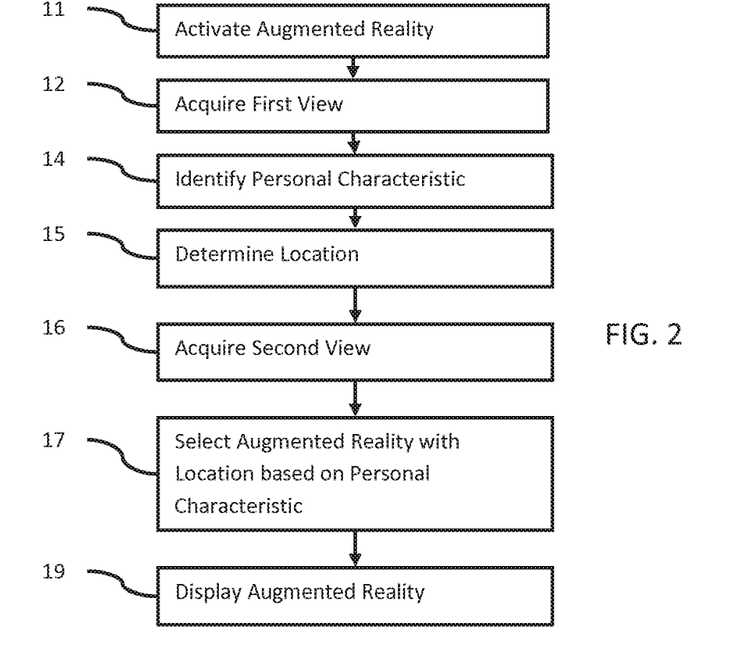
FIG. 2 illustrates a flow diagram of another embodiment of a method for mobile augmented reality personalization.

FIG. 1 shows a method for mobile augmented reality personalization. Output from mobile augmented reality or other applications assists users. The output is based, at least in part, on a personal characteristic of the user. FIG. 2 shows another method for mobile augmented reality personalization. The acts of FIGS. 1 and 2 are discussed together. The acts are performed in the order shown or a different order.

Additional, different, or fewer acts than shown in FIG. 1 or 2 may be used. For example, FIG. 2 shows additional acts as compared to FIG. 1, but without act 18. As another example, acts 17 and 19 of FIG. 2 are combined to provide act 18 in FIG. 1. In yet another example, act 12 is not provided and stored personal information is used instead of an acquired view. As another example, the augmented reality application is not activated in act 11 of FIG. 2, or act 11 is provided in FIG. 1.

FIGS. 1 and 2 are from the context of the mobile device. The camera or cameras of the mobile device are used to acquire views in acts 12 and 16. A processor of the mobile device applies an algorithm to identify a personal characteristic of a user in act 14 and to augment the scene. Augmented reality information associated with a given location may be downloaded to the mobile device and stored for selection of personalized augmented reality information in acts 17 and 18. The display of the mobile device presents the augmented reality in act 19.

In other embodiments, some or all of the acts are performed by or on a server or processor associated with a collector of data, such as a mapping database/provider. For example, acts 14 and/or 17-18 are performed remotely from the mobile device. The mobile device provides the views from act 12 and/or location from act 15. The remote server identifies the personal characteristic in act 14, and selects augmented reality information in acts 17 and 18 based on the personal characteristic. The selected augmented reality information or images using such information are transmitted to the mobile device for display in act 19.

In act 11 of FIG. 2, an augmented reality function of a mobile device is activated. The activation is by the user of the mobile device. The activation is by selection of an augmented reality, mapping, or navigation application. Alternatively, use of the camera in a particular fashion, such as using a back-facing camera to image a scene while in a navigation or map application, activates the augmented reality function. Other activations may be used, such as by user selection of a hard or soft button or in response to turning on another function or the mobile device.

In other embodiments, the activation is performed remotely. A signal to activate the augmented reality application of the mobile device is transmitted to the mobile device. For example, upon completion of download of the augmented reality application, the application is activated. As another example, a support person activates the augmented reality of a user's mobile device to better assist the user, such as to locate a store or other facility associated with the support person.

Once activated, one or more personal characteristics of the user are identified. In act 12 of FIG. 1 or 2, a view of the user is acquired. In the embodiment of FIG. 2, the view of the user is acquired in response to the activation of the augmented reality function. In the embodiment of FIG. 1, the view of the user is acquired in response to the activation or other trigger.

Figure 3:
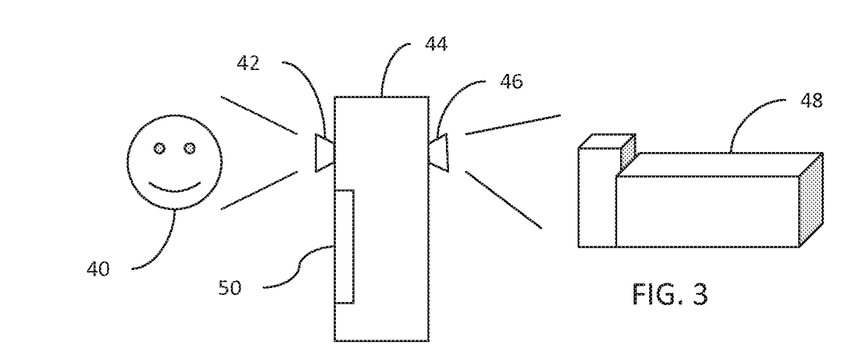
FIG. 3 illustrates an example dual-camera use of a mobile device for personalized augmented reality.

The view of the user is acquired with the front-facing camera of the mobile device. In the example of FIG. 3, a front-facing camera 42 of the mobile device 44 captures an image of the user 40. The camera, which may be used for video conferencing, acquires a picture or video of the user. In alternative embodiments, the back-facing camera is used to acquire the view. For example, the user is instructed to orient the mobile device to image the user, at least temporarily.

In other embodiments, an image is selected from a contact associated with the user of the mobile device. The mobile device may be linked to a particular user. The link is used to find a contact view of the user. Alternatively, the user indicates a stored image representing the user. Rather than using a camera of the mobile device, at least at the time of use of the augmented reality, a stored image is acquired. In yet other embodiments, the personal characteristic(s) of the user is identified in act 14 without an acquired image from act 12, such as by using non-photographic or non-videographic contact information for the user.

In act 14, a personal characteristic of the user of the mobile device is identified. The personal characteristic is identified from the view of the user. A still image or video of the user is used to determine one or more personal characteristics.

Any personal characteristics of the user are identified. The characteristics may change, such as mood, stress level, hair color, eye color, use of make-up, or use of jewelry. The characteristics may be relatively permanent, such as race, gender, age range, or identity. Other personal characteristics of a user may be identified.

To identify the personal characteristic from the view, a face of the user is detected from the view. In response to activation, the display shows the user for indicating the face location and/or confirming proper identification of personal characteristics. The user may draw a bounding box around the face with a finger, stylus, buttons, cursor arrows or other input device. The bounding box is similar in size and shape as the face, such as just surrounding the face. The bounding box is of any shape or size. The bounding box may delineate the face, allowing more efficient image processing. The user may select one of a plurality of faces in the view. In alternative embodiments, the face is not separately distinguished within the view.

In one embodiment, the face is detected using image processing. One or more algorithms are applied to the view. Filtering, feature extraction (e.g., find eye and mouth shaped features using pattern matching), template matching, correlation, or other processes are used to distinguish a face from other objects. Any face within the view is located, allowing segmentation of the face information. Only one face may be provided. Where multiple faces are in the view, the largest face is selected automatically or the user indicates which face to use.

Once the face is located, the face is used to determine the personal characteristic(s). The personal characteristics may be determined in various ways. The data representing the face may be directionally or otherwise filtered to highlight one or more types of features. Rather than comparison with a database, machine learning techniques may be used to identify the personal characteristic. Training data is used to determine the Bayesian or other machine learning network for predicting the personal characteristic from various extracted features. For example, Haar-type features are extracted from the view and used as inputs to a machine-learnt algorithm for determining one or more characteristics.

Face or identity recognition may be performed. An algorithm identifies features or other aspects of the face and compares with a database of features associated with known individuals. Given a match, the identity of the user is determined. The identity itself may be used as a personal characteristic. The identity of the user may be used to access other information, such as information available from social media and/or public resources. The user may be a subscriber of an application, so the identity may be used to access user provided information, such as gender, age, or other further characteristics. The identity is used to look-up other characteristics for the user that correspond to more generic attributes stored for the augmented reality information.

Facial expression recognition may be performed. An algorithm identifies features or other aspects of the face and compares with a database of features associated with known expressions. Expressions associated with mood and/or stress level may be recognized, such as expressions for anger, disgust, fear, happiness, sadness, or surprise. Given a match, the expression of the user is determined.

Gender recognition may be performed. An algorithm identifies features or other aspects of the face associated with gender and compares with a database. For example, the use of make-up, hair length, facial texture (e.g., whiskers or facial hair) or other features may distinguish between genders. Given a match, the gender of the user is determined.

Age recognition may be performed. An algorithm identifies features or other aspects of the face associated with age. For example, lines associated with wrinkles, curves associated with skin sagging, or other features may indicate age. The extracted features are compared with a database. Given a match, an estimated age or age range of the user is determined.

In act 15 of FIG. 2, a location of the mobile device is determined. The location is coordinates in a world, region or other frame of reference. Alternatively, the location is relative (e.g., 10 meters west of point of interest X). In alternative embodiments, the location is known, generalized to an area or region, or is not used.

The positioning coordinates are determined from a satellite system. The mobile device correlates spread spectrum signals form satellites to determine location, such as using the global positioning system (GPS).

Triangulation is alternatively used to determine the location. In triangulation, position circuitry includes a signal strength sensor or an array of signal strength sensors configured to measure the signal level from two or more antennas. The controller calculates the position of the mobile device from the signal strength measurements. Triangulation may be used in cellular networks, Bluetooth, or in wireless LAN and wireless mesh, as described in the IEEE 802.11 family of standards.

In addition or in the alternative to a signal strength sensor, the position circuitry may include a timer configured to measure the time necessary for a response from the network. The controller may estimate the position of the mobile device from the change in response times or by comparing response times from a plurality of antennas or access points.

In another example, proximity detection is used to determine location. A plurality of antennas is configured into a grid or other pattern. The position circuitry detects the closest antenna and the controller estimates the location of the mobile device. Proximity detection is limited by the density of the pattern of antenna. However, inexpensive technologies, such as radio frequency identification (RFID), are suited for dense grids of antennae.

The position circuitry may include relative position sensors in an inertial position system or dead reckoning system. Relative positions sensors include but are not limited to magnetic sensors (e.g., magnetometers, compasses), accelerometers, gyroscopes, and altimeters. Magnetic sensors determine the direction and/or strength of a magnetic field and can be used to determine heading or orientation. Inertial sensors, such as accelerometers and gyroscopes, measure acceleration, which can be used to calculate position, orientation, and velocity (direction and speed of movement) of the mobile device. An altimeter is a pressure sensor used to determine the relative altitude of the mobile device, which may be used to determine the vertical location of the mobile device.

A direction of view by the mobile device may be determined. The view is from the back-facing camera. The direction of viewing of the camera or other device capturing a scene to which augmented reality is to be applied is determined. The direction of the user's point of view may alternatively or additionally be determined, such as determining facial orientation relative to the camera imaging the user. The direction information is used to determine which objects are seen in the augmented reality scene relative to the location of the mobile device. The orientation may be used for mapping of the points of interest from the augmented reality onto the display of the mobile device. The orientation may be used to provide a perspective for the augmented reality that matches the perspective of the region imaged by the mobile device and seen by the user.

As an alternative to sensing orientation, image processing may be used to identify viewed structures. Image processing may be used to determine that a particular object in an image corresponds with a particular geographic location or structure. Using the location or structure, the imaged objects may be matched to points of interest adjacent to the location of the mobile device.

In act 16 of FIGS. 1 and 2, a view of a region at the location is acquired. The scene adjacent to the mobile device is captured. In the example of FIG. 3, the back-facing camera 46 captures the view including the buildings 48. The view is of objects viewable by the user of the mobile device. In alternative embodiments, the view is captured with a front-facing camera, such as by rotating the mobile device to orient the front-facing camera away from the user. The view may or may not include the user and objects adjacent to the user.

The view is an image or video of the surroundings. For a given field of view, the view is of one or more structures adjacent to or viewable from the mobile device. For example, a video of buildings adjacent to the mobile device is acquired. The video is of a given field of view or with the camera at a given orientation. Alternatively, the camera is rotated or moved to acquire an extended field of view. Also, in an alternative embodiment, the view or scene is not a substantially real time scene imaged via a view finder by the camera, but, instead, the view or scene is one or more stored images or video, such as a street view found in map applications. For example, such features may be accomplished using a mobile device as well as a non-mobile device, such as a desktop computer or other device.

The scene is acquired in act 16 in response to activation of the augmented reality function. The scene is acquired at a same time as the view of the user. Based on activation, the display of the mobile device begins showing the scene as captured by the camera. The display may be divided into different regions, allowing simultaneous display of the views from both cameras. Alternatively, the scene is captured before or after acquiring the view of the user and/or determining the personal characteristics of the user.

In act 17 of FIG. 2, augmented reality information is selected. The augmented reality information is selected by selecting a point of interest, thereby selecting augmented reality information for the selected point of interest. Points of interest include stores, landmarks, buildings, historic locations, restrooms, restaurants, bars, entertainment venues, or other location of interest to an individual, group or sub-group. Alternatively or additionally, the augmented reality information is selected as a sub-set of data for a given point of interest. The selection of act 17 is used to augment the scene in act 18 of FIG. 1. The scene is augmented in act 18 by providing information in addition to the reality or camera captured view.

The data for augmented reality is maintained in a database. The database is populated with the augmented reality information and personal characteristic attributes of points of interest. Augmented reality information, such as point of interest names, locations, history, statistics, hours of operation, contact information (e.g., phone, text, and/or email), Internet links, or other information used for augmented reality, is stored in the database for corresponding points of interest. Millions or other numbers of geo-referenced points of interest and corresponding augmented reality information is stored.

The database is populated to be queried by the personal characteristics and the geographic location. The points of interest and corresponding augmented reality information for each point of interest are linked with the geographic location in a mapping or other database. If the database is a mapping database, the points of interest and augmented reality information may be linked to a node or specific location. If the augmented reality information is stored in a separate database, the augmented reality information is linked by geographic location or point of interest identification for later queries. Alternatively, sufficient information to allow searching, such as Internet based searching, for accessing augmented reality information is stored. The augmented reality information is linked to the location by the location-based search information (e.g., business name and address).

The database includes personal characteristic attributes. A given point of interest is assigned to or labeled for one or more characteristics. For example, a clothing store is labeled as appropriate for ages 16-29 and women. The personal characteristic attributes for different points of interest are gathered with mapping and/or augmented reality data. Information may be gathered that is later associated with personal characteristics, or the personal characteristic attributes are assigned as part of the gathering process. Alternatively, a function or process for assigning personal characteristic attributes is performed on demand for any points of interest within the view of the scene or within a region associated with the location of the mobile device.

The selection of augmented reality information is based on the location. Points of interest adjacent to or within view of the location of the mobile device are selected. Augmented reality information for points of interest within the region around the location and/or for the part of the region in the direction of viewing is selected. The location indicates a region around the mobile device. Points of interest within a distance of the location may be selected. The orientation of the mobile device may be used to select points of interest likely in the view of the scene. Building or other size and shape information may indicate points of interest that may be viewed from the location in a particular direction. Alternatively, points of interest in a direction are identified regardless of any blocking structures.

Instead of or in addition to location, other criteria for selecting points of interest and corresponding augmented reality information may be used. In one embodiment, a processor, such as a processor within the mobile device or a remote server, executes an image recognition algorithm on the view of the scene. The processor performs instructions for extracting points of interest from the image. Any now known or later developed image recognition algorithm may be used. For example, the image is low pass filtered to remove higher frequency background information. Optical character recognition (OCR) may be applied to the image after filtering for extracting address or other alphanumeric text. Alternatively or additionally, pattern matching is applied. A template, such as of a building, is translated, rotated and scaled over various iterations. Different templates are matched. A similarity calculation, such as the minimum sum of absolute differences, is performed for each iteration. The template with the greatest correlation is identified as the match. Another pattern matching algorithm relies on feature extraction. The image is filtered or processed to determine various characteristics. Scale-invariant feature transform (SIFT) or speeded up robust features (SURF) may be used. The values for the characteristics are matched against the values for characteristics of known references. The reference with the greatest and/or sufficient correlation of features is identified as the match. The comparison may be governed by a matching constraint. The matching constraint may define a number of points required to trigger a match, a threshold level between intensities that defines the differing points, or a confidence level of the comparison. Other matching algorithms may be used, such as 3D to 2D edge matching. Once matched, one or more points of interest in the view are determined. Augmented reality information for the points of interest can be selected. Also, a user can select a point of interest by selecting an image object in the scene, such as by hovering a pointer (such as an electronic mouse) over an object in the scene or by other user selection methods utilizing one or more input devices or features. In such a case, correlations or associations between image objects and corresponding information (such as augmented reality information) may be predetermined or may occur in substantially real time.

The selection is also a function of the personal characteristic. The database of points of interest and/or augmented reality information includes fields associated with one or more personal characteristics. Bathrooms, clothing stores, entertainment venues and/or other points of interest are labeled by gender. Restaurants, pubs, entertainment venues, clothing stores, and/or other points of interest are labeled by age or age range. Entertainment venues, restaurants, parks, spas, pubs, and/or other points of interest are labeled by mood or stress level. Electronic advertisements are digital representations of a coupon, incentive, brochure, or other information related to a product or service offering. Advertisements for different points of interest may be labeled by any personal characteristic. For example, a given business point of interest may have different ads for different personal characteristics, such as different ads for different genders, ages, moods, stress levels, or other characteristic. Various combinations of type of characteristic (gender, age . . . ) and type of point of interest (e.g., restaurants, stores . . . ) may be used. One or more characteristics are matched with a given point of interest. Alternatively, the personal characteristic information is used for selecting (or filtering) augmented reality information to be presented and not for selection of points of interest.

Using the personal characteristic, augmented reality information is selected. One or more points of interest are selected based on the personal characteristic. The point of interest and corresponding augmented reality information associated with a given attribute (e.g., female for gender) is selected. A point of interest and corresponding augmented reality information not associated with the given attribute (e.g., male for gender) is not selected.

The location and characteristic based selections may be performed sequentially or simultaneously. For example, augmented reality information for points of interest appropriate for a given age and within a threshold distance or view of a given location is selected from the database of augmented reality information. Various combinations of parameters are used to simultaneously select points of interest and corresponding augmented reality information. As an example of sequential selection, the points of interest within the view of the scene are selected using the location information. The personal characteristic(s) are then used to select a sub-set of these location selected points of interest.

A single or multiple personal characteristics are used for selecting. For example, points of interest labeled as for high stress and younger adults (e.g., 22-30 year old) are identified. Points of interest labeled for low stress or other ages are not selected. As another example, gender alone is used for the selection. The corresponding augmented reality information is obtained by selection of the points of interest.

The selection is performed locally to the mobile device. The mobile device receives the personal characteristic and the geographic location. The information is received by the mobile device from processing of the mobile device. A memory of the mobile device includes augmented reality information. For example, augmented reality information for points of interest in a region of any size is stored, such as storing information for a city, county, state or country. Using the database in the memory of the mobile device, the selection is performed by the mobile device.

In other embodiments, the selection and/or other processing for augmenting a scene is performed remotely from the mobile device. The mobile device transmits the views, the personal characteristics, and/or the geographic location to a remote server. The view of the user or extracted personal characteristics information, the view of the scene, and the location are received as a request for augmented reality information. The server associates the view of the scene with a location. The location of the mobile device at the time of the view of the scene is captured is recorded, linked to the image, or embedded with the image data. The request is sent automatically, such as being sent in response to the activation in act 11. Alternatively, the user texts, emails, or otherwise causes the mobile device to transmit the views, personal characteristics, and/or geographic location.

The server, such as a server of a service provider or map provider, receives the view of the scene, personal characteristics or view of the user, and/or the geographic location. The view of the scene is associated with the geographic location. Where the image and location are received together, the association may occur upon receipt by recognition that both types of information for a same request have been received. If received separately, the server may use header information or other identifiers to associate the image with the geographic location.

Figure 4:
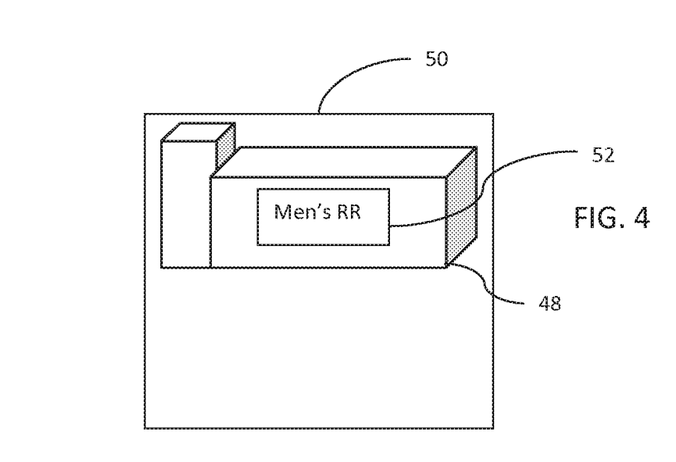
FIG. 4 illustrates an example personalized, augmented reality display.

Regardless of where the selection occurs, a graphic overlay for the point of interest is generated. Either the server or the mobile device uses the augmented reality information for selected points of interest to generate the graphic. Some or all of the augmented reality information for a given point of interest is formatted into a graphic or graphics for display on the view of the scene. The database may include templates for overlay or may include the graphic for each given point of interest. FIG. 4 shows an example graphic overlay 52. The point of interest within the view of the scene is identified as a men's restroom. Other information may be provided, such as hours of operation. More than one graphic for the point of interest may be generated, and/or graphic overlays for more than one point of interest in the view may be generated.

From the user's perspective, merely aiming the camera to view the scene and activating the augmented reality results in obtaining additional data, such as contact information, advertisements, or other personally relevant augmented reality information. The application on the user's mobile device with or without query to a server determines the personal characteristic of the user, such as being male. The mobile device, with or without query to a server, identifies points of interest within the view of the scene. The identification is based on the location of the user and the personal characteristic. In the example of FIG. 4, a men's restroom is identified as near the user and/or within the view of the scene. By simply imaging the scene, the display is augmented with information relevant to the user of the mobile device. Rather than show restrooms in general, the men's restroom is shown. Clutter associated with showing the women's restroom or a women's clothing store is avoided.

In act 19, the view of the scene is displayed. In the example of FIGS. 3 and 4, the image captured by the back-facing camera 46 of the scene 48 is displayed on the display 50 of the mobile device 44. The view of the scene is a still or video image. Alternatively, the displayed scene is a graphic derived from the image, such as a graphic showing boundaries or scene outlines. In another alternative, another representation of the scene, such as a map, is displayed. The map includes a graphical model of roads (such as Fake Rd., Green St., Blue Ave., Airport Rd., $2^{nd}$ St., Main St., $1^{st}$ St., Maple Ave, and/or other roads or paths), points of interest (such as an airport, a park, or a building), and other geographic or map features. The map is or is not photo/video imagery data. For example, the map is a vector-based, tile-based, or other type of graphical map model or representation. For example, the roads in the map are displayed based on map data, such as a road segment and corresponding nodes, that are created by a map developer. Graphical representations of the map are generated and/or displayed based on such map data. The map may be displayed in a 2D (such as a bird's eye view), 2.5D (such as a perspective view), or 3D view.

The view of the scene is displayed with the augmented information. The displayed view includes augmented reality information. The augmented reality information is displayed as a graphic overlay. The overlay is text, image, outline, icon, or other information not naturally occurring in the view of the scene.

The overlay is laid over the point of interest, positioned adjacent to the point of interest, or spaced from but graphically or conceptually associated with the point of interest in the view of the scene. The mobile device generates the overlay and determines the position of the overlay relative to the display or scene. Alternatively, a remote server communicates the position or image with the overlay to the mobile device. The location of the point of interest in the view is determined by pattern or template matching, by feature processing, or estimated based on the location and viewing direction. The location in the view may be determined as part of the identification of the point of interest. Alternatively, the location of the point of interest in the image is not specifically determined, and the position of the augmented reality information is generally related based on relative location.

FIG. 4 shows the graphic overlay as a text box shown on the point of interest. The augmented reality information for the point of interest within the view is displayed on and by the mobile device 44. In alternative embodiments, the display includes a link, such as to text, browser, email, or other communication system for accessing the augmented reality information or additional augmented reality information.

In an alternative embodiment, the graphic overlay is part of a map. Rather than or in addition to displaying the scene as an image or video, a map representing the scene with a corresponding graphic overlay for the augmented reality information is displayed.

The augmented reality is presented with the scene on the mobile device. To avoid clutter and/or to tailor the presented information, the points of interest and/or the augmented reality information displayed is tailored to the person using the mobile device. Different points of interest and/or augmented reality information are displayed for different users. For example, a scene includes various points of interest, such as a fire station, a park, a pub, and a retail store. Where the user is young, such as 14-18 years old, and stressed, such as having a worried expression, the display is augmented to include information about the fire station and not include additional information about the retail store. Where the user is happy and older, such as 21-30 years old, the display is augmented to include information about the park and the pub, but not about the fire station or retail store. Given the same location and orientation of the mobile device, different augmented reality information is presented for different users.

In addition to point of interest selection for augmentation, the type of augmented reality information presented may be based on the personal characteristic. For example, the augmented reality information for the retail store includes advertising information. Different ads are provided for people of different ages and/or genders. The ad appropriate for the user is displayed.

Figure 5:
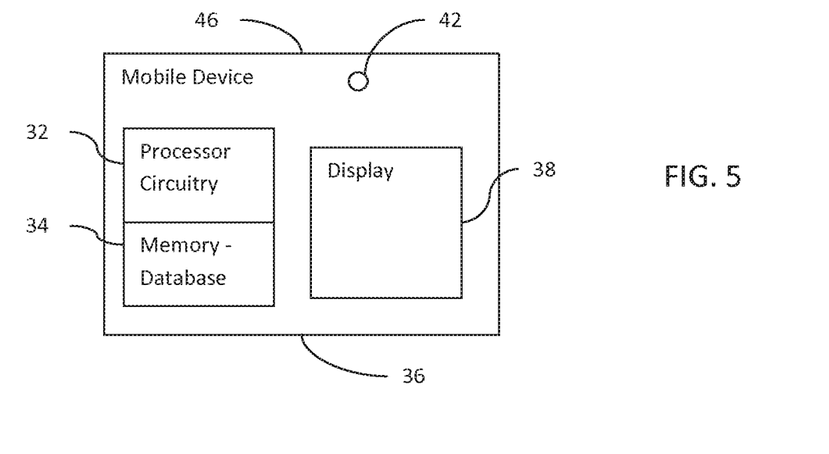
FIG. 5 illustrates one embodiment of a mobile device for mobile augmented reality personalization.

FIG. 5 illustrates an apparatus for mobile augmented reality personalization. The apparatus is a mobile device 36. The mobile device 36 is a cellular phone, mobile phone, camera, laptop, personal navigation devices, portable navigation device, personal data assistant, computer, tablet, smart phone, or other handheld device capable of capturing an image. The device may be carried with one hand, worn, or otherwise moved without assistance by others.

The mobile device 36 includes a processor or processing circuitry 32, a memory or database 34, a display 38, and cameras 42, 46. Additional, different, or fewer components may be provided. For example, only one camera 46 or 42 is provided. As another example, the processor 32 is not provided or used, instead relying on the image to be displayed on the display 38 being communicated from a remote server through a transceiver of the mobile device 36.

In yet another example, the mobile device 36 includes an input device, a communication interface, and/or position circuitry. The input device may be one or more buttons, keypad, keyboard, mouse, stylist pen, trackball, rocker switch, touch pad, voice recognition circuit, or other device or component for inputting data to the mobile device 36. The input device and the display may be combined as a touch screen, which may be capacitive or resistive. The display may be a liquid crystal display (LCD) panel, light emitting diode (LED) screen, thin film transistor screen, or another type of display.

The communication interface may include any operable connection. An operable connection may be one in which signals, physical communications, and/or logical communications may be sent and/or received. An operable connection may include a physical interface, an electrical interface, and/or a data interface. The communication interface provides for wireless and/or wired communications in any now known or later developed format. The same or different communications interface may be provided with the processor 32.

The position circuitry may include components for one or more of a variety of location algorithms. The Global Positioning System (GPS) is a satellite based system for reliable and accurate positioning but has limitations in indoor environments. However, GPS may be combined with or replaced by other location algorithms. Cellular or other positioning systems may be used as an alternative to GPS. Other global navigation satellite systems, such as the Russian GLONASS or European Galileo, may be used. In some implementations, the position circuitry may be omitted.

One or more cameras 42, 46 are provided. FIG. 5 shows two cameras, a forward-facing camera 42 and a backward-facing camera 46. Forward corresponds to facing the user, and backward corresponds to facing away from the user. In alternative embodiments, only one of the cameras is provided. Where needed, the mobile device 36 may be oriented to capture an image of the user or the scene, such as first imaging the user and then imaging the scene with a same camera. Alternatively, the camera may be positioned in or configured to move in any number of directions.

The camera 42, 46 may be configured to capture still and/or video images. The camera 42, 46 includes, but is not limited to, a lens and circuitry for taking pictures. Additional, fewer, or different components may be provided. For example, a flash or flash circuitry may be provided. The camera 42, 46 may capture images without taking a picture, such as activating the camera automatically. The user may activate the camera 42, 46 to take a picture, placing the image into a memory.

The camera 42, 46 captures an image for display of augmented reality. A still image or video of a scene is obtained using the camera 42, 46, such as the back-facing camera 46. The camera 42, 46 captures an image of the user for detecting personal characteristics. A still image or video of the user is obtained, such as obtaining with the front-facing camera 42. These different images may be obtained simultaneously or sequentially. In alternative embodiments, the memory 34 stores personal characteristics derived from an image or derived from another source, such as contact information or user entry.

The memory 34 is a volatile memory or a non-volatile memory. The memory 34 includes one or more of a read only memory (ROM), random access memory (RAM), a flash memory, an electronic erasable program read only memory (EEPROM), magnetic, optical, or other type of memory. The memory 34 is configured as a cache, buffer, local, remote, removable media, hard drive or other computer readable storage media. The memory 34 may be removable from the mobile device 36, such as a secure digital (SD) memory card.

In one embodiment, the memory 34 is non-transitory computer readable medium configured to store instructions, executable by the processor 32, for mobile augmented reality personalization. The instructions for implementing the processes, methods and/or techniques discussed herein are provided on the computer-readable storage media or memories. The computer executable instructions may be written in any computer language, such as C++, C#, Java, Pascal, Visual Basic, Perl, HyperText Markup Language (HTML), JavaScript, assembly language, extensible markup language (XML) and any combination thereof. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a cellular network.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

In one embodiment, the memory 34 is a local memory. For example, the memory 34 stores an image to which the processor 32 is applying an image recognition algorithm. As another example, the memory 34 stores a graphic overlay with or without the image to which the overlay is applied. The memory 34 is configured to store a captured image from a mobile device. The memory 34 also stores other information. For example, the memory stores personal characteristic data, whether derived from an image of the user or received from other sources. The memory 34 may store the geographical location associated with the image of the scene or mobile device, the orientation, personal characteristic information, augmented reality information, point of interest information, or other data.

The memory 34 may be a database memory. Geographic locations, point of interest information for points of interest, and personalization attributes of the points of interests are stored in the database. The database for the memory 34 of the mobile device 36 may be localized database, such as being for a region of operation of the mobile device 36. For example, the information for points of interest within a threshold distance (e.g., kilometers) and/or up to a threshold amount of memory space is downloaded to the memory 34 of the mobile device 36 for operation of the mobile device 36. As long as the mobile device 36 moves within the region associated with the downloaded data, the database is sufficient. If the mobile device 36 moves to another region, additional or different data is downloaded and stored.

The database stores non-location data referenced by geographical location and personal characteristics. The database may be a map database, including map or navigation data used for navigation-related services. The map data may include segment and node information. Other formats may be used for the map data. In one embodiment, the map database may be produced and/or maintained by a map developer, such as NAVTEQ North America, LLC located in Chicago, Ill. In other embodiments, a service provider maintains the database, but not necessarily with map information. For example, an augmented reality service provider other than a map developer creates the database of augmented reality information stored by location and personality characteristic. The map database may include image-related information, such as features extracted from images for determining personal characteristics and/or for determining points of interest in a scene.

The processor 32 is a controller, general processor, digital signal processor, an application specific integrated circuit (ASIC), field programmable gate array, analog circuit, digital circuit, combinations thereof, or other now known or later developed processor/circuitry. The processor 32 may be a single device or combinations of devices, such as associated with a network, distributed processing, or cloud computing. The processor 32 may include or be connected with a communications interface. Additional, different, or fewer components may be used. The processor 32 is part of the mobile device 36.

The processor 32 is configured by software and/or hardware to determine personal characteristics, to cause capturing of an image of the user by the camera 42, 46, to cause capturing an image of the scene to be augmented by the camera 42, 46, to identify points of interest, to select augmented reality information (e.g., by selecting points of interest), and/or to cause display of augmented reality information on the display 38. The processor 32 may determine, select or cause display by image processing or by transmitting a request and receiving the results. In one embodiment, the processor 32 of the mobile device performs the actions.

Figure 6:
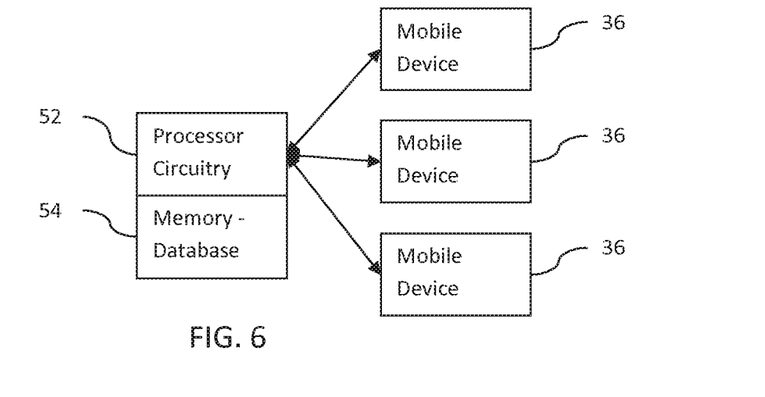
FIG. 6 illustrates a system for mobile augmented reality personalization according to one embodiment.

In an alternative, some of the processing is performed at a location remote from the mobile device 36. FIG. 6 shows a system for mobile augmented reality personalization. The system includes the processor or processing circuitry 52 and memory or database 54 as part of a server remote from one or more mobile devices 36. The processor 52 and memory 54 are in a different room, different city, or otherwise spaced from the mobile devices 36. For example, the processor 52 and memory 54 are part of a server providing navigation information to cellular phones.

The processing is shared between the remote processor 52 and any given mobile device 36. For example, the mobile device 36 captures and transmits images, requests image processing to determine personal characteristics, requests an augmented image, and/or displays a received augmented image. The processor 52 receives the images, image processes the image of the user to determine personal characteristics, selects points of interest and associated augmented reality information, generates an overlay, forms an image of the scene with the overlay, and/or transmits the augmented reality image to the mobile device 36 for display. In other embodiments, the mobile device 36 determines the personal characteristics, selects points of interest, generates the overlay, and/or forms the image.

Similarly, the memory of the mobile device 36 may be smaller where the remote memory 54 is used to link points of interest and augmented reality information with location. Rather than using the local memory 34, the remote memory 54 is used. The features for recognition and/or augmented reality information are stored in part or in total locally or remotely.

FIG. 6 shows the system as a network where the processor 52 and memory 54 operate with a plurality of mobile devices 36. Each mobile device 36 is operated by a different user with different personal characteristics. Each mobile device 36 is at a different location. Additional mobile devices 36, and/or processors 52 and memories 54 may be provided.

The mobile device 36 includes network interfaces for wirelessly or wired connection to the processor 52. The mobile devices communicate over a network. Any protocol or physical connection may be used to couple the processor 52 to the mobile devices 36. The communication paths may utilize cellular (e.g., 3G, 4G, or WiMAX), Ethernet, wireless, or any Internet protocol technologies. Alternatively, the communications network may be a private network that may not be connected to the Internet, a peer-to-peer network, or an ad-hoc network, such as a mobile mesh network including mobile devices and wireless links. In other embodiments, one or more of the mobile devices 36 are connected through a wire, such as USB cable. For example, the captured image of the user is stored in the mobile device 36 and downloaded to the processor 52 once the mobile device 36 connects using a wired or wireless path.

The processor 32 of the mobile device 36 or the processor 52 of the server is configured to provide point of interest information. The location and personalization characteristic of the user are used to determine augmented reality information. One or more points of interest are selected and the corresponding augmented reality information is identified from the database memory 34, 54. The processor 32, 52 is configured to output the point of interest information, such as the augmented reality information for a selected point of interest, to the mobile device 36. Where the processor 32 is part of the mobile device 36, the processor 32 outputs the information for display or to another processor.

In one embodiment, the remote processor 52 outputs a collection of database information to the mobile device 36. The collection is part of a database. The processor 32 of the mobile device 36 selects one or more points of interest from the collection. Differences in the personalization characteristic result in selection of different points of interest from the collection or for the collection. The selected points of interest and corresponding augmented reality information are different for different users based on the location of the mobile device and the personalization information. A personal characteristic of a user determines the points of interest and/or augmented reality information to be used for augmented reality.

In one embodiment, the processor 32, 52 is configured to execute an image recognition algorithm on a captured image of the user. The image recognition algorithm is configured to extract the personalization characteristics. For example, one of the mobile devices 36 captures an image of the user. The processor 32, 52, whether remote or local, receives the captured image and executes the image recognition algorithm to identify the user or identify another characteristic of the user. The characteristic is identified by matching, but may be identified by extracting text.

The processor 32, 52 is configured to cause display of an augmented reality. The augmented reality is displayed on the mobile device 36. The display is a view of a point of interest. Information in addition to the view augments the display. An augmented reality application may be stored in the memory 34 and executed by the processor 32. The augmented reality application enhances a user's view of the real world with virtual content. The virtual content is displayed in a layer above the real world content, which is captured by the camera. The virtual content provides information regarding the real world content. The virtual content may include non-location information, such as contact information or business operation information. Other examples of the virtual information include phone numbers, hours of operation, menus, prices, reviews, an e-mail address, a uniform resource locator link, a directory, a coupon, an incentive, and other information. The additional information is connected to the personalization characteristics. The connections are made in the data format and/or in a database.

The augmented reality application is an example of a viewing application. Examples of augmented reality applications include Wikitude, Layar Reality Browser, Cyclopedia, and Nearest Places. A viewing application is any program that enables the mobile device to receive image data or to output image data. The viewing application may be compatible with a Windows operating system, a Symbian operating system, an Android operating system, iOS, and/or other operating systems. One viewing application is a camera application. Even when the camera is not taking a picture, image data may be captured or analyzed as the mobile device 36 is panned around to display an image of a real world scene on the display.

An alternative viewing program is a mapping or navigation program, such as Bing™ maps. The map or navigation display may be augmented. Augmented reality information for selected points of interest is displayed with or on the map. Other viewing applications in addition to or as an alternative to camera images or video may be used.

Additional augmented reality information may be combined with any of the embodiments discussed above. The user may enter various preferences or other characteristics. For example, the user fills out a form related to shopping, eating, history, or other information of interest to the user. Using these personalized characteristics, the points of interest and corresponding augmented reality information are personalized. The mobile device 36 may highlight businesses that the user prefers, the restaurants matching the user's tastes, or ticket locations for preferred teams.

Various embodiments described herein can be used alone or in combination with one another. The foregoing detailed description has described only a few of the many possible implementations of the present invention. For this reason, this detailed description is intended by way of illustration, and not by way of limitation.

The invention claimed is:

1. A method comprising:
   receiving a first view of a face of a user from a first camera;
   determining, by a processor, a facial expression characteristic of the user from an analysis of the face of the user;
   receiving, by the processor, a second view from a second camera;
   identifying, by the processor, one or more points of interest in the second view;
   performing, by the processor, a query for the facial expression characteristic of the user that selects data for the one or more points of interest; and
   generating, by the processor, a third view comprising the second view with the data for the one or more points of interest.

2. The method of claim 1, further comprising:
   transmitting, by the processor, the third view to a mobile device.

3. The method of claim 1, wherein identifying the one or more points of interest comprises:
   extracting, by the processor, the one or more points of interest using an image recognition algorithm.

4. The method of claim 1, wherein identifying the one or more points of interest comprises:
   extracting, by the processor, the one or more points of interest using optical character recognition.

5. The method of claim 1, wherein identifying the one or more points of interest comprises:
   identifying, by the processor, a template of a building in the second view; and
   matching, by the processor, the template to a stored template for a point of interest of the one or more points of interest.

6. The method of claim 1, further comprising:
   performing, by the processor, feature extraction on the face of the user.

7. The method of claim 1, wherein the analysis of the face determines an identity of the user, wherein the data for the one or more points of interest is selected based on the identity of the user.

8. The method of claim 1, wherein the analysis of the face determines a permanent feature of the user, wherein the data for the one or more points of interest is selected based on the permanent feature of the user.

9. The method of claim 1, wherein the analysis of the face determines a temporary feature of the user, wherein the data for the one or more points of interest is selected based on the temporary feature of the user.

10. An apparatus comprising:
    at least one processor; and
    at least one memory including computer program code for one or more programs; the at least one memory configured to store the computer program code configured to, with the at least one processor, cause the apparatus to at least perform:

identify a first view of a user collected by a first camera of a mobile device;

perform an analysis of the first view of the user from the first camera;

determine a facial expression characteristic of the user from the analysis of the first view;

receive a second view including a point of interest from a second camera of the mobile device;

perform a query for the facial expression characteristic of the user that selects information for the point of interest; and provide the information with the second view.

11. The apparatus of claim 10, the at least one memory configured to store the computer program code configured to, with the at least one processor, cause the apparatus to at least perform:

identify the point of interest in the second view using optical character recognition.

12. The apparatus of claim 10, the at least one memory configured to store the computer program code configured to, with the at least one processor, cause the apparatus to at least perform:

identify the point of interest in the second view using input from the user.

13. An apparatus comprising:

a first camera, the first camera configured to capture a first view;

a second camera, the second camera configured to capture a second view;

a geographic database, the geographic database configured to store data for a point of interest;

a processor, the processor configured to identify a facial expression characteristic of a user from a face of the user in the first view and configured to identify the point of interest in the second view, the processor configured to select a subset of data of the data for the point of interest based on the facial expression characteristic, the processor further configured to generate a third view comprising the second view and the subset of data; and a display, the display configured to display the third view to the user.

14. The apparatus of claim 13, wherein the first view, second view, and third view are still images.

15. The apparatus of claim 13, wherein the processor is configured to identify the point of interest using optical character recognition.

16. The apparatus of claim 13, wherein the processor is configured to identify the point of interest using a building template.

17. The apparatus of claim 13, wherein the first camera is a forward facing camera and the second camera is a back facing camera.

18. The apparatus of claim 13, wherein the geographic database is remotely located from the processor.

19. The apparatus of claim 13, wherein the data for the point of interest is advertising data.

20. The apparatus of claim 13, wherein the processor is further configured to identify an age of the user from the face of the user in the first view, wherein the subset of data is further selected based on the age.

* * * * *